United States Patent
Buettiker et al.

(10) Patent No.: US 11,723,490 B2
(45) Date of Patent: Aug. 15, 2023

(54) GRINDER FOR GRINDING MATERIAL TO BE GROUND

(71) Applicant: JURA Elektroapparate AG, Niederbuchsiten (CH)

(72) Inventors: Philipp Buettiker, Oberbuchsiten (CH); Erich Ullmann, Egerkingen (CH)

(73) Assignee: JURA Elektroapparate AG, Niederbuchsiten (CH)

( * ) Notice: Subject to any disclaimer, the term of this patent is extended or adjusted under 35 U.S.C. 154(b) by 0 days.

(21) Appl. No.: 17/261,640

(22) PCT Filed: Aug. 21, 2019

(86) PCT No.: PCT/CH2019/000025
§ 371 (c)(1),
(2) Date: Jan. 20, 2021

(87) PCT Pub. No.: WO2020/037436
PCT Pub. Date: Feb. 27, 2020

(65) Prior Publication Data
US 2021/0259469 A1 Aug. 26, 2021

(30) Foreign Application Priority Data
Aug. 21, 2018 (EP) .................................... 18190044

(51) Int. Cl.
*A47J 42/40* (2006.01)
*A47J 42/38* (2006.01)
(Continued)

(52) U.S. Cl.
CPC ..................... *A47J 42/40* (2013.01)

(58) Field of Classification Search
CPC .. A47J 42/40; A47J 42/38; A47J 42/08; A47J 31/42
See application file for complete search history.

(56) References Cited

U.S. PATENT DOCUMENTS

| 9,980,610 | B2 | 5/2018 | Sahli et al. | |
| 2016/0045071 | A1* | 2/2016 | Sahli | A47J 42/20 |
| | | | | 241/261.2 |
| 2019/0380535 | A1* | 12/2019 | Ullmann | F16C 35/063 |

FOREIGN PATENT DOCUMENTS

| EP | 2 050 377 A1 | 4/2009 |
| EP | 2 764 807 A1 | 8/2014 |

(Continued)

OTHER PUBLICATIONS

Bonded Seal Washer, retrieved date Sep. 7, 2022. https://www.amazon.com/Swordfish-31981-Automotive-Bonded-Assortment/dp/B01MXI57Y9/ref=sr_1_29?crid=XVMEWZBICZAW&keywords=Bonded+Sealing+Washers&qid=1662598446&sprefix=bonded+sealing+washers+%2Caps%2C605&sr=8-29.*

(Continued)

*Primary Examiner* — Matthew Katcoff
*Assistant Examiner* — Mohammed S. Alawadi
(74) *Attorney, Agent, or Firm* — Collard & Roe, P.C.

(57) ABSTRACT

The grinder includes a container having a discharge opening for material to be ground; first and second grinding tools, the first tool rotatable relative to the second grinding tool about a rotation axis for crushing the material in a gap between the tools. The second tool has an inlet channel limited by a wall section around the axis for supplying material into the gap and is moveable relative to the first tool axially to the axis. A collar seal between container and second tool has a through-channel for discharging material into the inlet channel and is stationary relative to the container so that a first annular collar seal section limiting the through-channel contacts the container and overlaps the second tool wall section toward the axis. The collar seal includes a second annular section connected to the first annular section via an elastic spring and supported on a contact surface.

11 Claims, 6 Drawing Sheets

(51) Int. Cl.
   *A47J 42/08*     (2006.01)
   *A47J 31/42*     (2006.01)

(56) References Cited

FOREIGN PATENT DOCUMENTS

| WO | 2014/206944 A1 | 12/2014 | | |
|----|----------------|---------|---|---|
| WO | 2016/029355 A1 | 3/2016 | | |
| WO | WO-2016029355 A1 * | 3/2016 | ........... | B65B 29/022 |

OTHER PUBLICATIONS

English translation of the International Preliminary Report on Patentability and Written Opinion of the International Searching Authority in PCT/CH2019/000025, dated Feb. 23, 2021.
International Search Report in PCT/CH2019/000025, dated Dec. 2, 2019.

\* cited by examiner

GRINDER FOR GRINDING MATERIAL TO BE GROUND

CROSS REFERENCE TO RELATED APPLICATIONS

This application is the National Stage of PCT/CH2019/000025 filed on Aug. 21, 2019, which claims priority under 35 U.S.C. § 119 of European Application No. 18190044.0 filed on Aug. 21, 2018, the disclosure of which is incorporated by reference. The international application under PCT article 21(2) was not published in English.

TECHNICAL DOMAIN

The invention relates to a grinder for grinding material to be ground, in particular for grinding coffee beans.

PRIOR ART

A grinder of said type can be provided, for example, in combination with an automatic coffee machine or alternatively also used alone.

A grinder for grinding material to be ground (for example coffee beans) in accordance with the prior art usually comprises:
- a container for receiving material to be ground with a discharge opening for the material to be ground;
- a first grinding tool and a second grinding tool, wherein the first grinding tool is configured to be rotated relative to the second grinding tool about an axis of rotation in such a way that the material to be ground is enabled to be crushed to a powder in a grinding gap formed between the first grinding tool and the second grinding tool, wherein the second grinding tool has an inlet channel through which material to be ground is enabled to be supplied from the discharge opening of the container into the grinding gap, and wherein the second grinding tool is mounted in such a way that it is axially moveable with regard to the axis of rotation and is enabled to be brought into various positions relative to the first grinding tool and to the container, and wherein the second grinding tool comprises a wall section which extends annularly around the axis of rotation and radially delimits the inlet channel to the outside;
- a housing with an internal space delimited by the housing in which the first grinding tool and the second grinding tool are arranged;
- a collar seal with a through channel extending along the axis of rotation, said collar seal being arranged between the container and the second grinding tool so that material to be ground is enabled to fall through the discharge opening of the container via the through channel of the collar seal into the inlet channel of the second grinding tool.

The spatial dimensions of the grinding gap determine the grain sizes of the powder produced when grinding the material to be ground and thus the degree of grinding of the produced powder. As the second grinding tool is movable axially to the axis of rotation and can be brought into various positions relative to the first grinding tool, the spatial dimensions of the grinding gap are variable. Through changing the position of the second grinding tool axially to the axis of rotation relative to the first grinding tool, the degree of grinding of the powder produced during grinding can be changed and thereby it can be affected whether the powder produced during grinding contains more or less coarse or fine particles.

There are various types of grinders which differ in terms of the shape and arrangement of the grinding tools, e.g. conical grinders or disk grinders.

A grinder (envisaged in particular for grinding coffee beans) of the aforementioned type is disclosed in EP 2764807 A1 for example. In the case of this grinder (disclosed in EP 2764807 A1), the container for receiving the material to be ground is arranged at a predetermined position (fixed with regard to the axis of rotation) above the grinding gap. For this purpose, the container for receiving the material to be ground is, in particular, arranged in a fixed position in relation to the housing in which the first grinding tool and the second grinding tool are located. The collar seal (designated "coupling element 18" in EP 2764807 A1) arranged between the container for receiving the material to be ground and the second grinding tool, is made of an elastic material (e.g. plastic) and mounted on the second grinding tool to connect the container for receiving the material to be ground to the second grinding tool and to allow material to be ground to fall out of the container through the through channel delimited by the collar seal into the grinding gap. As the collar seal is mounted on the second grinding tool, the spatial position of the collar seal changes with regard to the container if the position of the second grinding tool is moved axially to the axis of rotation in order to change the degree of grinding of the powder produced during grinding. If the position of the second grinding tool is changed axially to the axis of rotation, the distance between the second grinding tool and the container axially to the axis of rotation also changes. Here there is the danger of a gap occurring between the collar seal and the container which can be so wide that splinters of the material to be ground escape through this gap during grinding and become widely distributed in the grinder causing undesirable soiling of the grinder. The danger of a gap occurring between the collar seal and the container when the position of the second grinding tool is changed axially to the axis of rotation can be countered in that in the present case the collar seal is made of an elastic material and is therefore elastically deformable. In this way it is at least achieved that the shape of the collar seal can adapt to the container and/or the outer shape of the container within certain tolerances when the position of the second grinding tool is axially changed with regard to the axis of rotation. Here, the shape of the collar seal can adapt to the container and/or the outer shape of the container within particularly large tolerances if the collar seal is made of a soft, flexible material. However, if the collar seal is made of a soft, flexible material, there is the danger that splinters of the material to be ground produced during grinding can be hurled upwards out of the grinding cap during grinding and on hitting the collar seal can produce a pressure acting on the collar seal that is so great that the collar seal is deformed. Here too, a gap can occur between the collar seal and the container through which splinters of the material to be ground can escape. Accordingly, a collar seal of the aforementioned type has the drawback that it can only inadequately seal off the gap between the second grinding tool and container against splinters of the material to be ground if the degree of grinding of the powder is to be changed over a relatively large range.

A further grinder (envisaged for grinding coffee beans) of the aforementioned type is, for example, disclosed in WO 2016/029355 A1. In the case of this grinder the first grinding tool (in WO 2016/029355 A1 designated as "grinding head 94") and the second grinding took (in WO 2016/029355 A1 designated as "grinding head 92") are placed inside a housing. In order to be able to change the position of the second grinding tool axially to the axis of rotation and thus relative to the first grinding tool, an adjusting ring (in WO 2016/029355 A1 designated as "screw ring 106") being rotatable about the axis of rotation is provided. The adjusting ring is arranged on the housing in such a way that it can be turned manually about the axis of rotation, wherein the second grinding tool is mechanically connected to the rotatable adjusting ring so that on turning the adjusting ring, the second grinding tool is moved relative to the adjusting ring, to the first grinding tool and to the housing axially to the axis of rotation. The container for receiving the material to be ground (in WO 2016/029355 A1 designated as "hopper 52") is supported directly on the rotatable adjusting ring. For this purpose, the container for receiving the material to be ground is connected to the adjusting ring by way of a collar seal (in WO 2016/029355 A1 designated as "base unit 72"). In this case, the collar seal is arranged between the container for receiving the material to be ground and the adjusting ring in such a way that the container for receiving the material to be ground is supported above the collar seal on an upper surface of the adjusting ring. The collar seal comprises a first annular section which outwardly radially delimits a through channel (in WO 2016/029355 A1 designated as "inlet 74") for coffee beans, wherein the collar seal is arranged stationarily relative to the container for the material to be ground in such a way that the first annular section extends axially to the axis of rotation so that a first area of the first annular section is in contact with the container and a second area of the first annular section has an overlapping section in the direction of the axis of rotation with a wall section of the second grinding tool, which outwardly radially delimits an inlet channel for material to be ground formed in the second grinding tool. In order to keep the container for receiving the material to be ground in a stable position above the adjusting ring, in this case the collar seal as a whole is configured as a rigid body. This has the disadvantage that as the container for receiving the material to be ground is supported on the adjusting ring by way of the collar seal, due to the container the adjusting ring is subjected to a relatively large mechanical stress. Accordingly, the design of the collar seal and the adjusting ring is complex in order to guarantee relatively stable positioning of the container on the adjusting ring.

SUMMARY OF THE INVENTION

The aim of the present invention is to avoid said drawbacks and to create a grinder for grinding material to be ground with a collar seal which allows reliable sealing against splinters of the material to be ground even when the degree of grinding of the powder that can be produced during grinding is to be variable over a relatively wide range.

This aim is achieved by a grinder with the features of claim 1.

The grinder for grinding material to be ground, in particular for grinding coffee beans comprises: a container for receiving material to be ground with a discharge opening for the material to be ground; a first grinding tool and a second grinding tool, wherein the first grinding tool is rotatable relative to the second grinding tool about an axis of rotation in such a way that material to be ground is enabled to be crushed to a powder in a grinding gap formed between the first grinding tool and the second grinding tool, wherein the second grinding tool has an inlet channel through which material to be ground discharged out of the discharge opening of the container is enabled to be supplied into the grinding gap, and wherein the second grinding tool is mounted in such a way that it is axially movable with regard to the axis of rotation and is enabled to be brought into various positions relative to the first grinding tool and the container; a housing with an internal space delimited by the housing in which the first grinding tool and the second grinding tool are arranged, wherein the container is stationarily arranged in relation to the housing; a collar seal with a through channel extending along the axis of rotation, said collar seal being arranged between the container and the second grinding tool so that material to be ground is enabled to fall out of the container through the discharge opening of the container via the through channel of the collar seal into the inlet channel of the second grinding tool, wherein the second grinding tool comprises a wall section which annularly extends around the axis of rotation and outwardly radially delimits the inlet channel. The collar seal has a first annular section which outwardly radially delimits the through channel, wherein the collar seal has a second annular section, which extends annularly around the axis of rotation and is connected to the first annular section, and a contact surface is provided on which the second annular section of the collar seal is supported in order to hold the collar seal in a predetermined position relative to the container.

According to the invention the collar seal is arranged stationarily relative to the container in such a way that the first annular section extends axially to the axis of rotation so that a first area of the first annular section is in contact with the container and a second area of the first annular section has an overlap with the wall section of the second grinding tool in the direction of the axis of rotation. The collar seal also comprises at least one connecting section which extends between the first annular section and the second annular section and is connected to both the first annular section and the second annular section, wherein the at least one connecting section is designed as an elastically deformable spring element.

As the collar seal is arranged stationarily relative to the container in such a way that the first area of the first annular section is in contact with the container, it is achieved that the spatial position of the collar seal, in particular the spatial position of the first annular section of the collar seal, does not change relative to the container when the position of the of second grinding tool is changed axially to the axis of rotation relative to the container. The first area of the first annular section can thus always be in contact with the container when the position of the second grinding tool is changed axially to the axis of rotation relative to the container. More particularly, the first annular section can be held so close on the container that there is no intermediate space between the first annular section and the container through which splinters of the material to be ground produced during grinding could pass.

In this context "overlap in the direction of the axis of rotation" designates an arrangement of the first annular section of the collar seal and the wall section of the second grinding tool such that at least one area of the first annular section of collar seal extending axially to the axis of rotation and an area of the wall section of the second grinding tool extending axially to the axis of rotation are arranged relative to each other axially to the axis of rotation, so that the area of the first annular section of collar seal extending axially to the axis of rotation and the area of the wall section of the second grinding tool extending axially to the axis of rotation are arranged next to each other along a path parallel to the axis of rotation ("overlap region"). Here, the wall section of the second grinding tool and the first annular section of the collar seal can be arranged relatively close to each other so that between the wall section of the second grinding tool and the first annular section of the collar seal there is no intermediate space which splinters of the material to be ground produced during grinding could pass.

As the second area (for example an area facing away from the container) of the first annular section of the collar seal has an overlap with the wall section of the second grinding tool in the direction of the axis of rotation, it is therefore achieved that axially to the axis of rotation the second grinding tool can be moved relative to the container and relative to the first annular section of the collar seal by a "predetermined distance", which essentially corresponds to the extension of the overlap area in the direction of the axis of rotation, and it can thereby be guaranteed that there is no intermediate space between the wall section of the second grinding tool and the first annular section of the collar seal, through which splinters of the material to be ground produced during grinding could pass.

As the collar seal comprises at least one connecting section which extends between the first annular section and the second annular section and is connected both to the first annular section and also to the second annular section, it is achieved that with regard to the connecting section the collar seal can be configured in a number of variants (depending on the respective purpose of use). For example, the collar seal can comprise a plurality of connection sections. The at least one connecting section or every connecting section can extend radially to the axis of rotation for instance.

As the at least one connecting section is designed as an elastically deformable spring element it is also achieved that the first annular section is elastically coupled via one or more such connecting sections to the second annular section of the collar seal. The respective connecting sections of the collar seal are configured to hold the first annular section in a rest position relative to the second annular section. Furthermore, the respective connecting sections of the collar seal are deformed when the first annular section is displaced from the rest position and thereby exert a (restoring) force on the first annular section which is directed against the displacement of the first annular section from the rest position.

The at least one connecting section or the respective connecting sections can, in particular, be elastically deformable in such as a way that the first annular section is movable relative to the second annular section in the direction of the axis of rotation. For example, the first annular section of the collar seal can be displaceable from a rest position relative to the second annular section in the direction of the axis of rotation.

As the at least one connecting section is elastically deformable or the respective connecting sections are elastically deformable it is, in particular, possible to compensate for tolerances in terms of the arrangement of the container relative to the housing in which the first grinding tool and the second grinding tool are arranged, and tolerances in terms of the arrangement of the container relative to the contact surface on which the second annular section of the collar seal is supported, through corresponding deformations of the respective connecting sections. Accordingly, as the at least one connecting section is elastically deformable or the respective connecting sections are elastically deformable it is possible to arrange the same collar seal in such a way that the second annular section of the collar seal is supported on the contact surface and the first annular section of the collar seal is in contact with the container, even if the container is to be arranged at different positions relative to the contact surface (as a result of tolerances with regard to the arrangement of the container relative to the housing or as a result of tolerances with regard to the contact surface relative to the housing).

One form of embodiment of the grinding tool comprises a contact surface, stationary with regard to the container, on which the collar seal is supported in order to hold the collar seal in a fixed manner relative to the container. This form of embodiment allows the collar seal to be arranged stationarily relative to the container in a simple manner.

A further development of this form of embodiment comprises a contact surface which is stationary with regard to the container and on which the second annular section of the collar seal is supported in order to keep the collar seal stationary relative to the container. The second annular section of the collar seal offers a simple possibility of arranging the collar seal irrespective of the size and shape of the first annular section of the collar seal. The size and shape of the second annular section of the collar seal can be suitably selected—in each case adapted to the shape and spatial position of the contact surface.

In the forms of embodiment described above, the contact surface can, for example, be arranged in such a way that axially to the axis of rotation the contact surface has a predetermined position relative to the container so that that the position of the contact surface does not change axially to the axis of rotation when the second grinding tool moves axially to the axis of rotation and can there be brought into various positions relative to the first grinding tool and to the container.

One form of embodiment of the grinder is configured in such a way that the first annular section and the second annular section extend annularly around the axis of rotation in such a way that the first annular section and the second annular section are each at a distance from the axis of rotation. The second annular section can, for example, be a greater distance from the axis of rotation than the first annular section. The second annular section of the collar seal can therefore be supported on a stationary contact surface which (in comparison with the first annular section of the collar seal) can be arranged at a relatively great distance from the axis of rotation.

One form of embodiment of the grinding tool is configured in such a way that on the side of the first annular section of the collar seal facing away from the axis of rotation, the second annular section of the collar seal extends along the periphery of the first annular section. This arrangement of the second annular section allows a collar seal to be designed which has a small extension axially to the axis of rotation.

A further development of the aforesaid example of embodiment of the grinder is characterised in that, on the container, there is a contact surface for the first annular section of the collar seal that extends annularly around the discharge opening, and on the first annular section of the collar seal there is a contact surface for the container which extends annularly around the through channel. Furthermore, the first annular section is arranged relative to the second annular section in such a way that the at least one connecting section is elastically pretensioned and produces a pressing force which presses the contact surface for the container formed on the first annular section to the contact surface for the first annular section formed on the container. The magnitude of the pressing force can be selected so that due to the pressing force, the first annular section of the collar seal is held in a stable position on the contact surface formed on the container and annularly extending around the discharge opening.

The contact surface formed on the container for the first annular section of the collar seal can, for example, be a flat surface. Correspondingly, the contact surface formed on the first annular section for the container can be a flat surface. This allows simple manufacturing of the respective contact surfaces. Furthermore, it is ensured in a simple manner that the contact surface for the container formed on the first annular section of the collar seal and extending annularly around the through channel, can be in contact along its entire periphery with the contact surface formed on the container for the first annular section of the collar seal and extending annularly around the discharge opening. In this way it is reliably ensured that no intermediate space can occur between the container and the first annular section of the collar seal through which splinters of the material to be ground produced during grinding could pass.

In the "overlap area" in which the first annular section of the collar seal has an overlap with the wall section of the second grinding tool in the direction of the axis of rotation, a gap can be formed between the first annular section of the collar seal and the wall section of the second grinding tool. The spatial dimensions of such a gap (corresponding to the degree of grinding of the powder to be produced during grinding) can determined in such a way that splinters of the material to be ground produced during grinding cannot pass through it. Alternatively, the wall section of the second grinding tool and the first annular section of the collar seal can be shaped or configured in such a way that the wall section of the second grinding tool contacts the first annular section in a sliding manner when the second grinding tool is moved in the direction of the axis of rotation. In this way it is ensured that there is no intermediate space between the annular section of the collar seal and the wall section of the second grinding tool through which splinters of the material to be ground produced during grinding can pass.

In the aforementioned examples of embodiment of the grinder, the overlap has an extent in the direction of the axis of rotation which can be changed when moving the second grinding tool in the direction of the axis of rotation.

BRIEF DESCRIPTION OF THE DRAWINGS

Further details of the invention, and, in particular, forms of embodiment of the grinder according to the invention, are explained below by way of the attached drawings. In these.

DESCRIPTION OF FORMS OF EMBODIMENT

Figure 1:
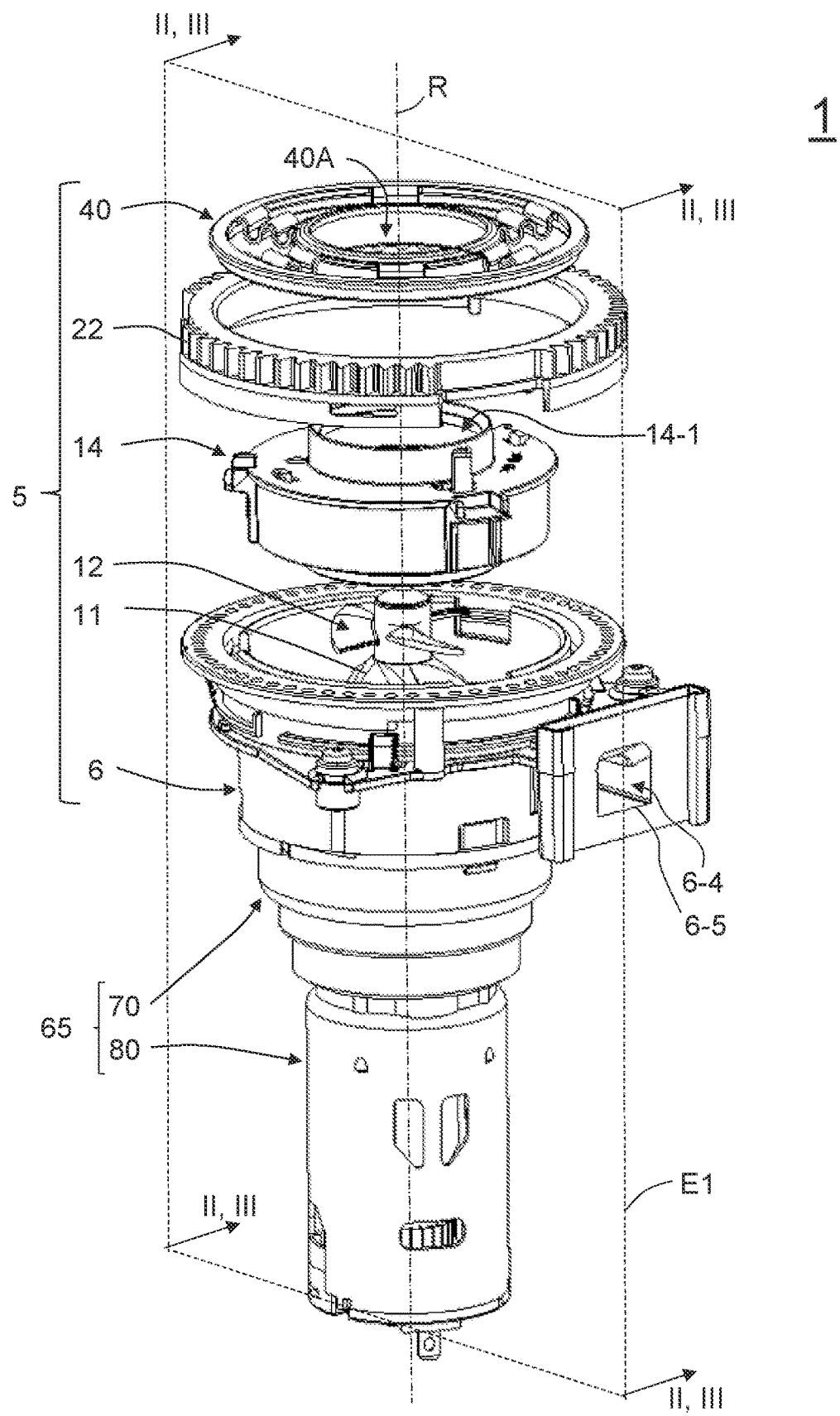
FIG. 1 shows in perspective an exploded view of a grinder according to the invention with a first grinding tool, a second grinding tool and a collar seal, but without showing a container for receiving material to be ground.

Unless otherwise stated, the same reference numbers are used for the same elements in the figures.

FIGS. 1-4 show a grinder 1 for grinding coffee beans which comprises a grinding device 5, a container 30 for receiving material to be ground (coffee beans) and a drive unit 65 having a gear unit 70 and a drive motor 80.

The grinding device 5 comprises a first grinding tool 11, a second grinding tool 14 and a carrier wheel 25, wherein these components are enclosed by a housing 6 which has an outlet channel 6-4 with an outlet opening 6-5 for discharging coffee powder. The first grinding tool 11 is rotatable relative to the second grinding tool 14 about an axis of rotation R so that coffee beans can be crushed to a coffee powder in a grinding gap 20 configured between the first grinding tool 11 and the second grinding tool 14.

In this example, the grinder 1 is designed as a "conical grinder". Accordingly, the first grinding tool 11 of the grinding device 5 is configured as a grinding cone with an outer surface that is structured in such a way that it comprises a plurality of edges extending in a screw-like manner around the axis of rotation that are suitable for crushing coffee beans. Accordingly, the second grinding tool 14 of the grinding device 5 has a grinding element 15, which is designed as a grinding ring and extends annularly around the axis of rotation R, and a surface facing the axis of rotation R. This surface of the grinding element 15 facing the axis of rotation R is structured in such a way that it also comprises a plurality of edges which are suitable for crushing coffee beans.

Figure 2:
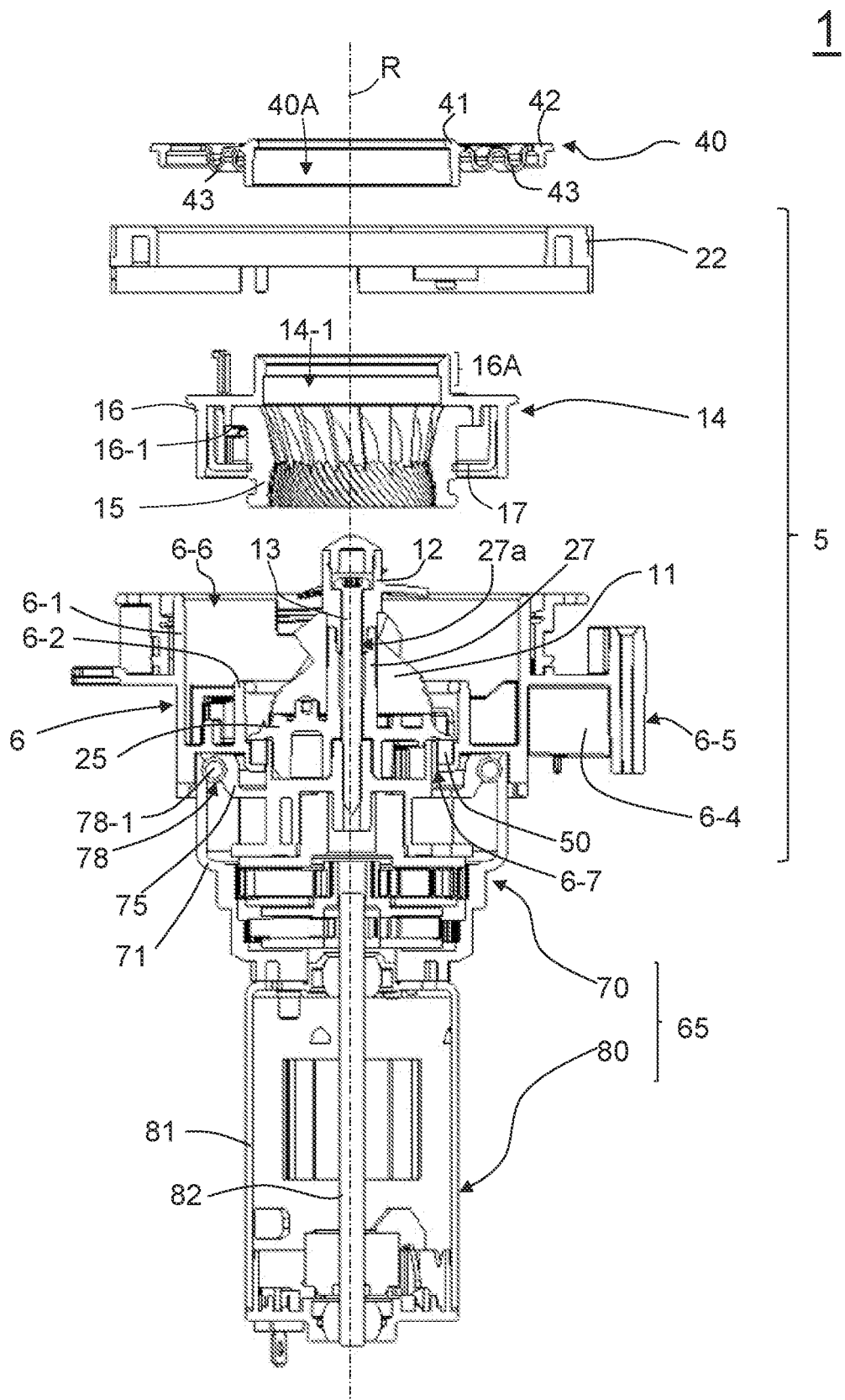
FIG. 2 shows an exploded view of the grinder according to FIG. 1 in cross-section along plane E1 in FIG. 1, seen in the direction of the arrows with reference numbers II in FIG. 1.

In the exploded views of the grinder 1 according to FIGS. 1 and 2, shown in order from the first grinding tool 11 upwards are: a rotatable conveying element 12 (in this example in the form of a screw conveyor), a fastening screw 13, the second grinding tool 14, and adjusting ring 22 for positioning the second grinding tool 14 and a collar seal 40.

The carrier wheel 25 is rotatable jointly with the first grinding tool 11 about the axis of rotation R and comprises a disk-shaped area which extends radially relative to the axis of rotation R and on an upper side (on the first grinding tool 11 and facing the second grinding tool 14) has an edge area extending annularly around the axis of rotation R on which, on rotation of the carrier wheel 25 about the axis of rotation R, the coffee powder produced during operation of the grinder 1, can be conveyed to the outlet channel 6-4, in order to allow discharge of the produced coffee powder from the grinding device 5 through the outlet opening 6-5. Additionally, the carrier wheel 25 has an elongated sleeve 27 in the middle of the disk-shaped area extending upwardly along the axis of rotation R, and a boring 27a extending along the axis of rotation R. As will be explained below, the sleeve 27 is essentially for producing a mechanical connection between the carrier wheel 25, the first grinding tool 11, the conveying element 12 and the drive device 65. In order to make efficient conveying of coffee powder possible by means of the carrier wheel 25, a plurality of carrier wings 26 is arranged on the edge area of the carrier wheel which—relative to the axis of rotation R—extend axially upwards and radially outwards. Due to its arrangement relative to the axis of rotation, each of these carrier wings 26 is, on turning the carrier wheel 25 about the axis of rotation R in a direction corresponding with the direction of rotation of the carrier wheel 25, suitable for carrying along coffee power located on the edge area and thus convey it through a space extending around the axis of rotation 25 in the direction of rotation of the carrier wheel 25.

As can be seen from FIGS. 2, 3 and 4, the housing 6 of the grinding device 5 has an upper opening 6-6 and a lower opening 6-7 through said openings an internal space delimited by the housing 6 can be accessed from above and below. The upper opening 6-6 is used for placing various components of the grinding device 5 from above into the internal space delimited by the housing 6 when assembling the grinding device 5, or, during operation of the grinding device 5 to introduce the coffee beans to be ground into the internal space from above. The lower opening 6-7 allows a connection to be established between the drive device 65 placed below the housing 6 and those components of the grinding device 5 placed in the internal space which are to be driven by drive device 65.

Figure 3:
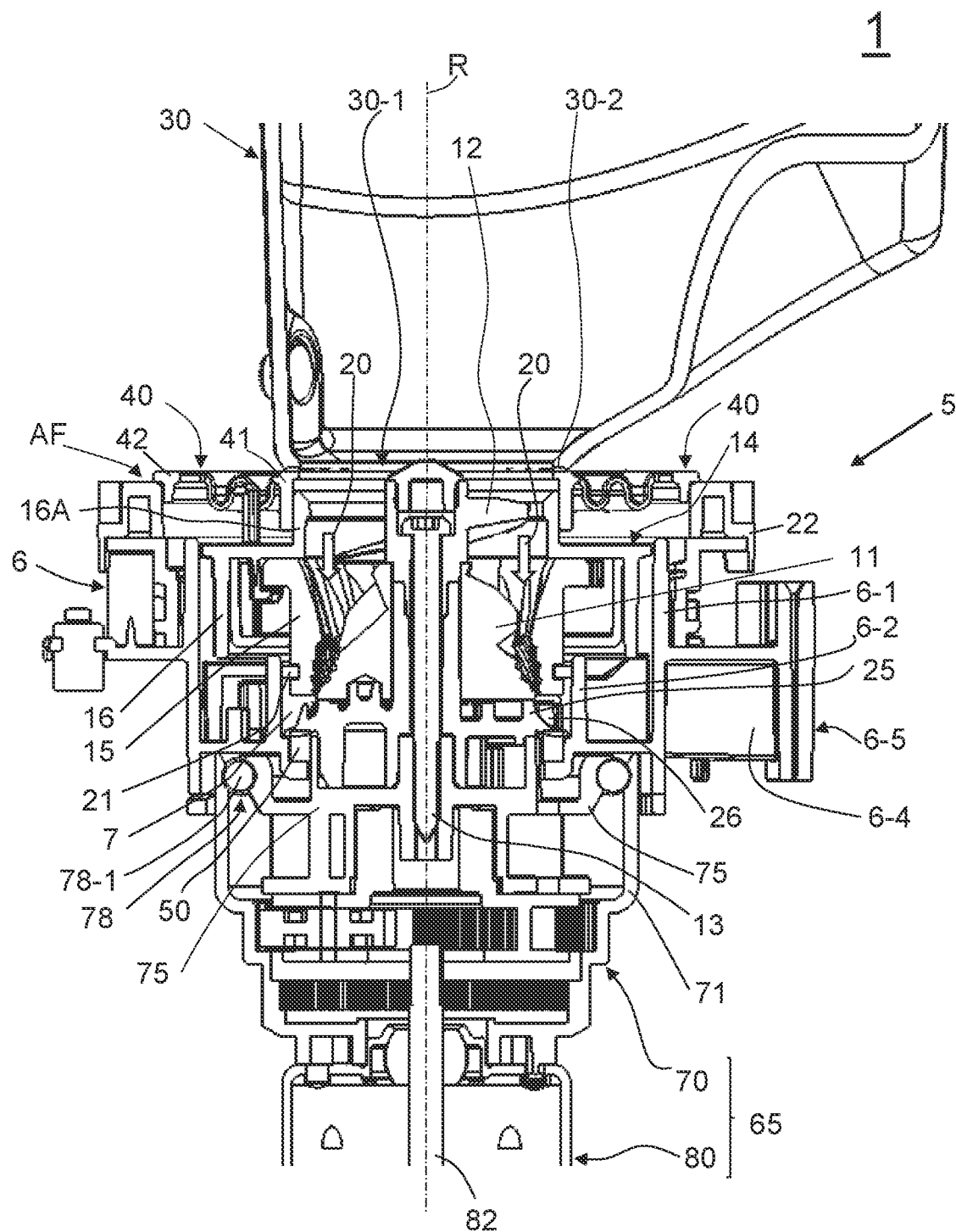
FIG. 3 shows the grinder according to FIG. 1 with a container for receiving material to be ground and a collar seal arranged stationarily relative to the container, seen in cross-section along plane E1 according to FIG. 1 in the direction of the arrows with reference numbers III in FIG. 1.
Figure 4:
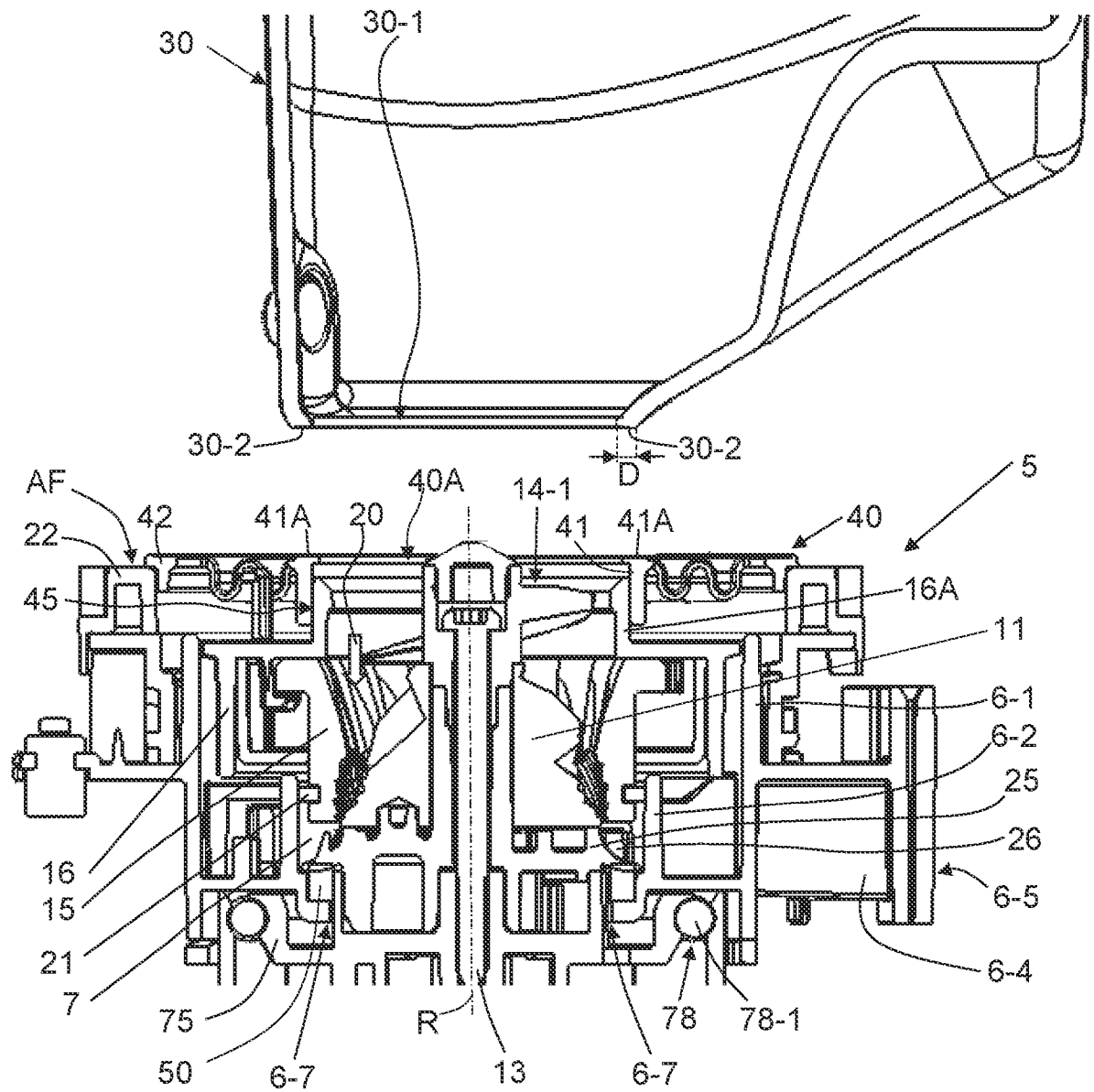
FIG. 4 shows the grinder according to FIG. 1 with a container for receiving material to be ground and a stationarily arranged collar seal, shown in cross-section as in FIG. 3, wherein—in order to illustrate design details of the container—the container is shown in a situation in which the container is shown separately and above the collar seal at a distance from the collar seal.

As can be seen from FIG. 2-4, the housing 6 has various walls or wall areas (e.g. walls/wall areas 6-1, 6-2) which serve to spatially separate the internal space delimited by the housing 6 in order to create chambers which provide space for various components of the grinding device 5. In particular, the housing 6 comprises a first (outer) wall 6-1 which delimits the upper opening 6-6 and also forms an outer boundary of the internal space. The first wall 6-1 essentially extends annularly around the axis of rotation R and encloses a spatial area adjoining the upper opening 6-6 which provides room for arranging the conveying element 12, the first grinding tool 11 and the second grinding tool 14.

In this example, the second grinding tool 14 is configured in multiple parts and, in particular, comprises the grinding element 15 (grinding ring) and a carrier 16 for the grinding element 15. By way of the carrier 16 the grinding element 15 is held in a stationary manner relative to the housing 6. For this purpose, the carrier 16 comprises snap elements 16-1 for holding the grinding element 15. A fastening ring 17 is fixed on the carrier 16 in order to lock the snap elements 16-1 so that the grinding element 15 is held firmly on the carrier 16. The adjusting ring 22 is borne rotatably about the axis of rotation R on the housing 6 and is mechanically connected to the carrier 16 in such a way that through turning the adjusting ring 22 about the axis of rotation R, the carrier 16 with the grinding element 15 can be displaced upwards or downwards in the direction of the axis of rotation R. In this way the arrangement of the second grinding tool 14 relative to the first grinding tool 11 can be changed so that the degree of grinding of the coffee powder to be produced can be adjusted. The adjusting ring 22 is borne on the housing 6 in such a way that on turning the adjusting ring 22 about the axis of rotation R, the spatial position of the adjusting ring 22 axially to the axis of rotation R is not changed.

The first grinding tool 11 is arranged centred with regard to the second grinding tool 14 in such a way that the second grinding tool 14 extends annularly around the first grinding tool 11 at a distance from the first grinding tool 11 and therefore a grinding gap 20 is formed between the first grinding tool 11 and the second grinding tool 14 in which coffee beans can be crushed to coffee powder between the first grinding tool 11 and the second grinding tool 14 if the first grinding tool 11 is turned about the axis of rotation R relative to the second grinding tool 14.

In order to be able to introduce coffee beans into the grinding gap 20, the second grinding tool 14 has an inlet channel 14-1 which extends along the axis of rotation R and is delimited radially outwards by a wall section 16A extending annularly about the axis of rotation R. In this example, the wall section 16A is formed as a section of the carrier 16 which extends upwards above the grinding element 15 axially to the axis of rotation R. In addition, the wall section 16A and the grinding element 15 extend around the axis of rotation R in such a way that radially to the axis of rotation R the wall section 16A and the grinding element 15 are at around the same distance from the axis of rotation R. Through this it is ensured that coffee beans falling from above into the inlet channel 14-1, reach the grinding gap 20. The grinding gap 20 is formed in such a way that at its upper end it has area extending radially around the axis of rotation R that acts as an entry gap for coffee beans, wherein the width of the entry gap is selected so that whole coffee beans can pass through the entry gap. The grinding gap 20 is also formed in such a way that at the end remote from the entry gap it has an area extending annularly around the axis of rotation R which acts as an outlet gap for coffee powder, so that during grinding, coffee powder produced in the grinding gap 20 has to leave the grinding gap 20 via the outlet gap, wherein a width of the outlet gap limits the grain size of the produced coffee powder and thus defines the degree of grinding of the produced coffee powder.

The rotatable conveying element 12 conveys coffee beans supplied through the inlet channel 14-1 along the axis of rotation R into the grinding gap 20 between the first grinding tool 11 and the second grinding tool 14.

As can also be seen from FIGS. 3-4, the grinding gap 20 is connected to a spatial area 7 of the internal space which is surrounded by the housing 6 and is envisaged for produced coffee powder and through which the coffee powder must be conveyed in order to reach the outlet channel 6-4 or outlet opening 6-5. The spatial area 7 envisaged for the coffee powder is delimited at the top by the first grinding tool 11 and the second grinding tool 14 and is delimited radially outwards by a second wall 6-2 which extends annularly around the axis of rotation R in the internal space enclosed by the housing 6 at a distance from the lower opening 6-7 of the housing 6. The spatial area 7 is also delimited at the bottom by the carrier wheel 25.

In order to prevent ground coffee powder being able to escape upwards from the spatial area 7, a sealing ring 21 is clamped between the grinding element 15 and the second wall 6-2 of the housing 6. To also prevent ground coffee powder escaping downward out of the spatial area 7, a sealing ring 50 is arranged under the carrier wheel 25 which seals off the underside of the carrier wheel 25 from the housing 6.

As can be seen from FIG. 1-3, the drive device 65 is arranged on an underside of the housing 6, wherein the gear unit 70 of the drive device 65 is located directly at the lower opening 6-7 of the housing 6.

The gear unit 70 comprises a gear casing 71, a drive output 75 for driving the carrier wheel 25, the first grinding tool 11 and the conveyor element 12, and a roller bearing 78 with ball bearings 78-1 which guides the drive output 75 on the gear casing 71. In order to be able to drive the drive output 75 the drive motor 80 is arranged under the gear unit 70. The drive motor 80 has a separate housing 81 which is held stationarily on the gear casing 71, wherein a drive shaft 82 of the drive motor 80 is connected to the drive output 75 so that the drive output 75 can rotate synchronously with the drive shaft 82 of the drive motor 80.

In order to be able to drive the carrier wheel 25, the first grinding tool 11 and the conveying element 12, the carrier wheel 25, the first grinding tool 11 and the conveying element 12 are rigidly connected to the drive output 75 of the gear unit 70. The drive output 75, the carrier wheel 25, the first grinding tool 11 and the conveying element 12 are arranged—in this order—behind each other along the axis of rotation R. The drive output 75, the carrier wheel 25, the first grinding tool 11 and the conveying element 12 are designed in a complementary manner in such a way that the drive output 75, the first grinding tool 11 and the conveying element 12 are positively connectable to the carrier wheel 25. For this purpose the first grinding tool 11 has a central boring which extends along the axis of rotation R and is formed in such a way that the sleeve 27 of the carrier wheel 25 can be positively inserted from the underside of the first grinding tool 11 into the central boring of the first grinding tool 11, namely in such a way that the conveyor element 12 can be positively inserted at the upper end of the sleeve 27 into the boring 27a which is provided in the sleeve 27 along the axis of rotation R. In turn, the drive output 75 is configured so that at least one section of the drive output 75 can be positively inserted from the underside of the carrier wheel 25 into the boring 27a in the carrier wheel 25.

As FIGS. 2-4 also indicate, the drive output 75, the carrier wheel 25, the first grinding tool 11 and the conveying element 12 are connected by way of screw 13 to form a rigid assembly which in its entirety can be rotated about the axis of rotation R relative to the housing 6. For this purpose, the screw 13 can be passed through continuous borings, which extent through the conveying element 12, the first grinding tool 11 and the carrier wheel 25 along the axis of rotation R to the drive output 75, so that the screw 13 can be screwed onto a thread provided on the drive output 75 in order to clamp the conveying element 12, the first grinding tool 11 and the carrier wheel 25 onto the drive output 75.

During operation of the grinder 1, in order be able to convey the material to be ground (coffee beans) into the grinding gap 20, the grinder 1 has a container 30 for receiving material to be ground with a discharge opening 30-1 for the material to be ground. During operation of the grinder 1, the container 30 is usually arranged stationarily at a predetermined position relative to the housing 6 of the grinding device 5 so that the discharge opening 30-1 is placed over the inlet channel 14-1 of the second grinding tool 14 (FIG. 4, 6A, 6B).

As indicated by FIGS. 1-4, 5A, 5B, 6A and 6B, the collar seal 40 comprises a through channel 40A extending along the axis of rotation R and is arranged between the container 30 and the second grinding tool 14 in such a way that material to be ground can fall out of the container 30 through the discharge opening 30-1 of the container 30, via the through channel 40A of the collar seal 40 into the inlet channel 14-1 of the second grinding tool 14.

The collar seal 40 is, in particular, stationarily arranged relative to the container 30 and comprises a first annular section 41, which delimits the through channel 40A radially outwards, wherein the first annular section 41 extends axially to the axis of rotation R in such a way that a first area 41 is in contact with the container 30 and a second area of the first annular section 41 has an overlap with the wall section 16A of the second grinding tool 14 in the direction of the axis of rotation R.

In this context "overlap in the direction of the axis of rotation" designates an arrangement of the first annular section 41 of the collar seal 40 and the wall section 16A of the second grinding tool 14 such that an area of the first annular section 41 of the collar seal 40 extending axially to the axis of rotation R and an area of the wall section 16A of the second grinding tool 14 extending axially to the axis of rotation R, are arranged relative to each other such that the area of the first annular section 41 extending axially to the axis of rotation R and an area of the wall section 16A of the second grinding tool 14 extending axially to the axis of rotation R are arranged next to each other along a section directed in parallel to the axis of rotation R (hereinafter "overlap area").

Figure 6A:
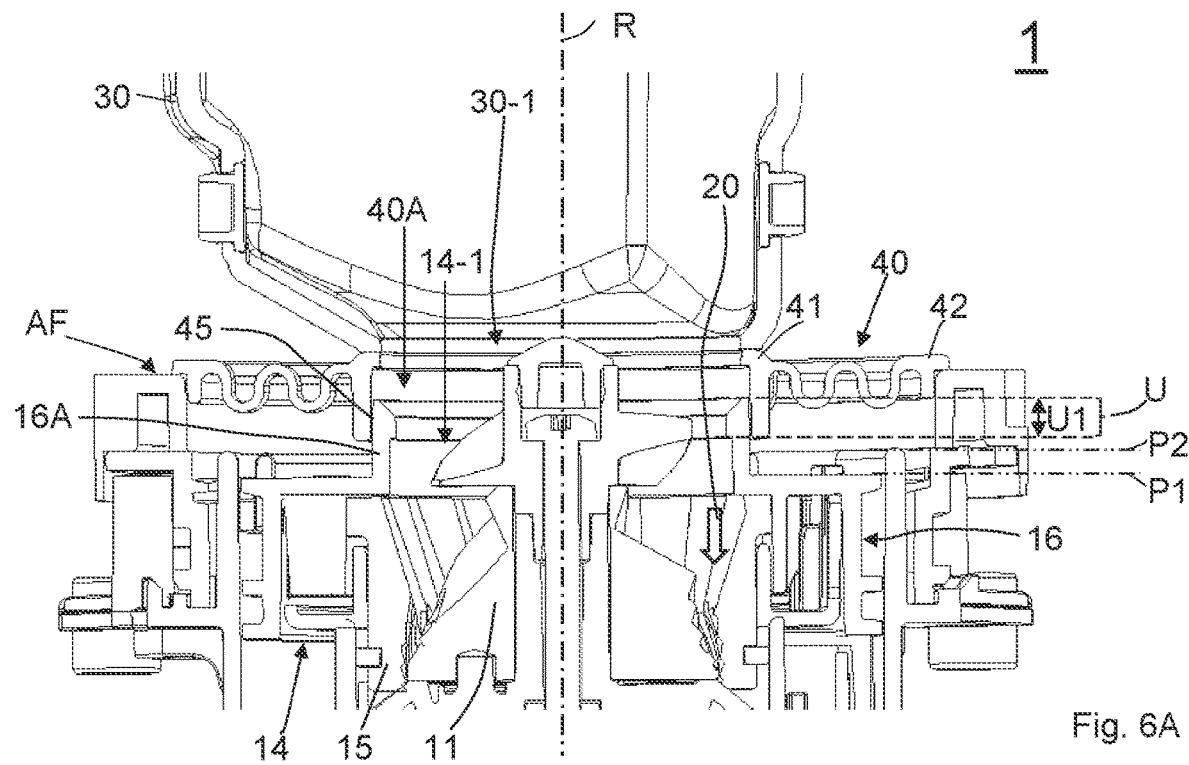
FIG. 6A shows the grinder according to FIG. 1 with a container for receiving material to be ground and a collar seal arranged stationarily relative to the container, seen in cross-section along the axis of rotation of the first grinding tool, wherein the second grinding tool is brought into a first (lower) position.
Figure 6B:
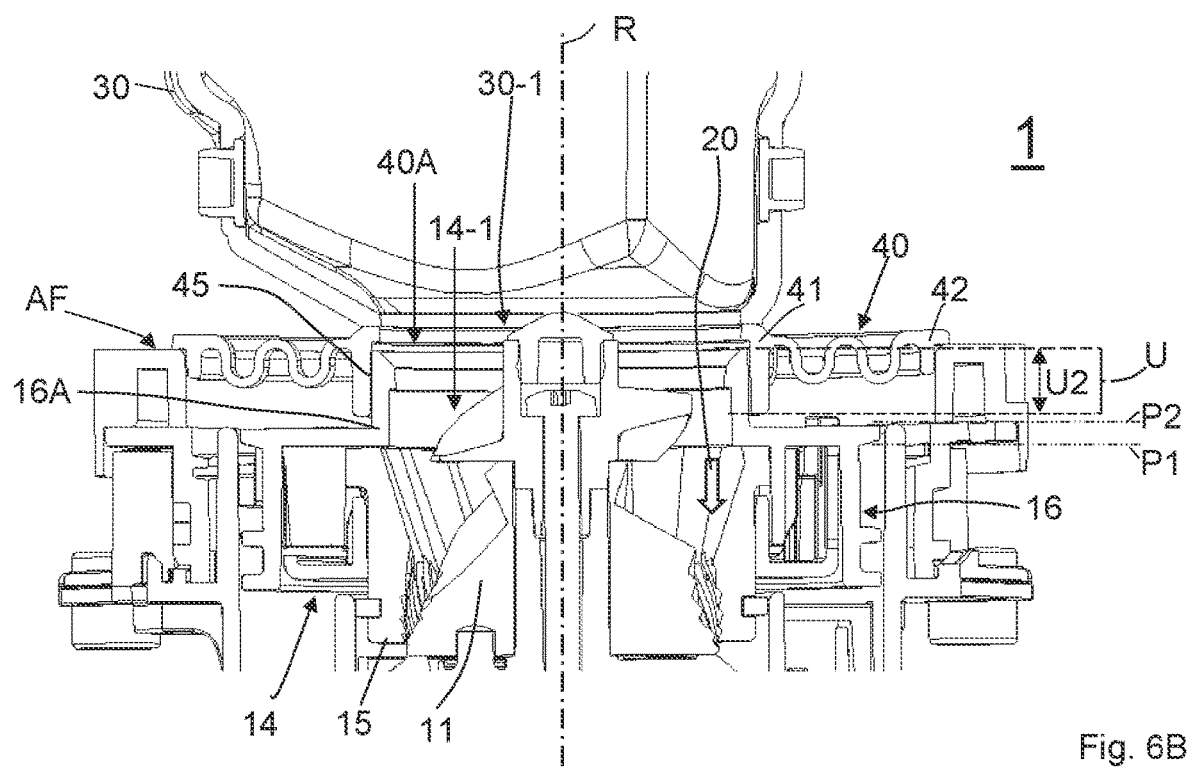
FIG. 6B shows the grinder according to FIG. 6A, wherein the second grinding tool is brought into a second (upper) position.

To illustrate an "overlap area" reference is made in particular to FIGS. 6A and 6B: in FIGS. 6A and 6B the respective overlap area of the first annular section 41 of the collar seal 40 and of the wall section 16A of the second grinding tool 14 is represented by a section designated "U" which is directed in parallel to the axis of rotation 6 (i.e. along the section "U" or in "overlap area U", the first annular section 41 of the collar seal 40 and the wall section 16A of the second grinding tool 14 overlap in the direction of the axis of rotation R).

In this example, overlapping of the annular section 41 of the collar seal 40 and the wall section 16A of the second grinding tool 14 is made possible in that the annular section 41 of the collar seal 40 and the wall section 16A of the second grinding tool 14 extend about the axis of rotation R at different distances from the axis of rotation R. As can be seen from FIGS. 3, 4, 6A and 6B, the wall section 16A has an external contour, which in comparison to the through channel 40A of the collar seal 40 is dimensioned so that the wall section 16A can be inserted from the side of the collar seal 40 facing away from the container 30 into the through channel 40A of the collar seal 40 by way of a movement in the direction of the axis of rotation R so that an end section of the wall section 16A facing the container 30 projects from below (or from the side facing away from the container) into the through channel 40A of the collar seal 40.

The outer contour of the wall section 16A can be dimensioned in such a way that a gap 45 is formed in the overlap area U between the first annular section 41 of the collar seal 40 and the wall section 16A of the second grinding tool 14 (as indicated in FIGS. 4, 6A and 6B). The spatial dimensions of this gap 45 can be selected so that splinters of the material to be ground that are produced during grinding cannot pass through the gap 45. To this end, radially to the axis of rotation R the gap 45 can have a width in the range of 0.1 to 0.2 mm for example.

Alternatively, the wall section 16A of the second grinding tool 14 can be designed in such a way that when the second grinding tool 14 is moved in the direction of the axis of rotation R in the through-channel 40A the wall section 16A of the second grinding tool 14 contacts the first annular section 41 in a sliding manner.

It is also pointed out that—as an alternative to the forms of embodiment of the grinder 1 shown in the figures— overlapping of the annular section 41 of the collar seal 40 and the wall section 16A of the second grinding tool 14 would also be made possible if the annular section 41 of the collar seal 40 has an outer contour which is dimensioned in such a way that the annular section 41 of the collar seal 40 could be introduced into the inlet channel 14-1 of the second grinding tool 14 from the side of the second grinding tool 14 facing the container 30 along the axis of rotation R, so that an end section of the annular section 41 of the collar seal 40 facing away from the container 30 projects from above (or from the side facing the container 30) into the inlet channel 14-1 of the second grinding tool 14 (not shown in the figures).

As can be seen from FIG. 4, on the container 30 there is a contact surface 30-2 for the first section 41 of the collar seal 40 which extends annularly around the discharge opening 30-1. In the example according to FIG. 4, the contact surface 30-2 has a width D radially to the axis of rotation R. Correspondingly, on the side of the first annular section 41 of the collar seal 40 facing the container 30, there is a contact surface 41A for the container 30 which extends annularly around the through channel 40A. In this example, the contact surface 30-2 formed on the container 30 for the first annular section 41 and the contact surface 41A formed on the first annular section 41 for the container 30 are both flat surfaces. This has the advantage that the contact surface 30-2 and the contact surface 41A can be easily produced and the container 30 and the collar seal 40 easily arranged relative to each other in such a way that the contact surface 41A for the container 30 is tight on the contact surface 30-2 for the first annular section 41 irrespective of which position the second grinding tool 14 is brought into relative to the container 30.

In the situations shown in FIGS. 3, 6A and 6B, the collar seal 40 is in each case arranged stationarily relative to the container 30 in such a way that the contact surface 41A and the contact surface 30-2 lie tightly on each other along a line extending annularly around the axis of rotation R so that between the contact surface 41A and the contact surface 30-2 there is no intermediate space through which splinters of the material to be ground produced during grinding can pass.

The situations shown in FIGS. 6A and 6B differ in that through turning the adjusting ring 22 the second grinding tool 14 is brought into different axial positions relative to the container. In the case of FIG. 6A, the second grinding tool 14 is brought into a first (lower) position P1 with regard to the axis of rotation R. Here, the overlap area U of the first annular section 41 of the collar seal 40 and the wall section 16A of the second grinding tool 14 has an extent in the direction of the axis of rotation R which is shown with reference number U1 in FIG. 6A. In the case of FIG. 6B the second grinding tool 14 is brought into a second (upper) position P2 with regard to the axis of rotation R. Here, the overlap area U of the first annular section 41 of the collar seal 40 and the wall section 16A of the second grinding tool 14 has an extent in the direction of the axis of rotation R which is shown with reference number U2 in FIG. 6B. As can be seen, the overlap area U in the case of FIG. 6B has a larger extent in the direction of the axis of rotation R than in the case of FIG. 6A (i.e. U2>U1). Accordingly, the overlap area U has an extent in the direction of the axis of rotation R which is variable on moving the second grinding tool 14 in the direction of the axis of rotation R.

In order to hold the collar seal 40 in a stationary position relative to the container 30, the grinder 1 has at least one contact surface which is stationary with regard to the container 30 and on which the collar seal 40 can be supported. In the case of the forms of embodiment illustrated in the figures, the adjusting ring 22 has on its upper side a surface which extends annularly around the axis of rotation R and which (as has been mentioned) does not change its position axially to the axis of rotation R even when the adjusting ring 22 is turned about the axis of rotation R. Accordingly, the upper side of the adjusting ring 22 forms a stationary contact surface AF (FIGS. 3, 4, 6A, 6B). In the case of the shown forms of embodiment, the collar seal 40 is therefore held stationarily relative to the container 30 in that on its periphery it is supported on the contact surface AF formed on the upper side of the adjusting ring 22.

Alternatively, it would of course be conceivable to select other surfaces which are stationary relative to the container 30 as a contact surface for the collar seal 40, for example a contact surface which is correspondingly stationary on the housing 6.

In one of the forms of embodiment shown in the figures, the collar seal 40 comprises a second annular section 42 which extends annularly around the axis of rotation R and is connected to the first annular section 41. In order to keep the collar seal 40 stationary relative to the container 30, the second annular section 42 of the collar seal 40 is supported on the contact surface AF formed on the upper side of the adjusting ring 22 (FIG. 3, 4, 6A, 6B).

The first annular section 41 and the second annular section 42 of the collar seal 40 extend annularly around the axis of rotation R in such a way that the first annular section 41 and the second annular section 42 are each at a distance from the axis of rotation R. In the shown examples, the second annular section 42 extends at a greater distance from the axis of rotation R than the first annular section 41. This design of the collar seal 40 makes it possible to support the collar seal 40 by means of the second annular section 42 on a contact surface AF which is at a relatively large distance from the axis of rotation R.

As can be seen from FIGS. 1, 3, 5A and 5B in particular, the collar seal 40 can be designed in such a way that it comprises a connecting section 43 which extends between the first annular section 41 and the second annular section 42 and is connected to both the first annular section 41 and also the second annular section 42. The collar seal 40 can comprise a plurality of such connecting sections 43, for example two, three, four, five, six or more connecting sections 43.

Figure 5A:
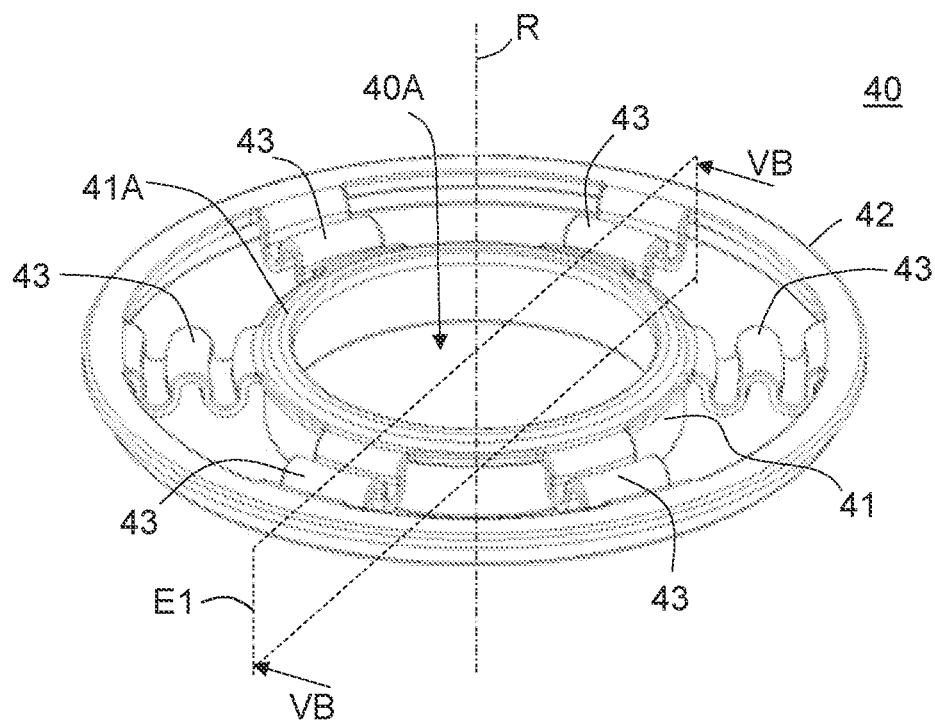
FIG. 5A shows a perspective view of the collar seal according to FIG. 1.
Figure 5B:
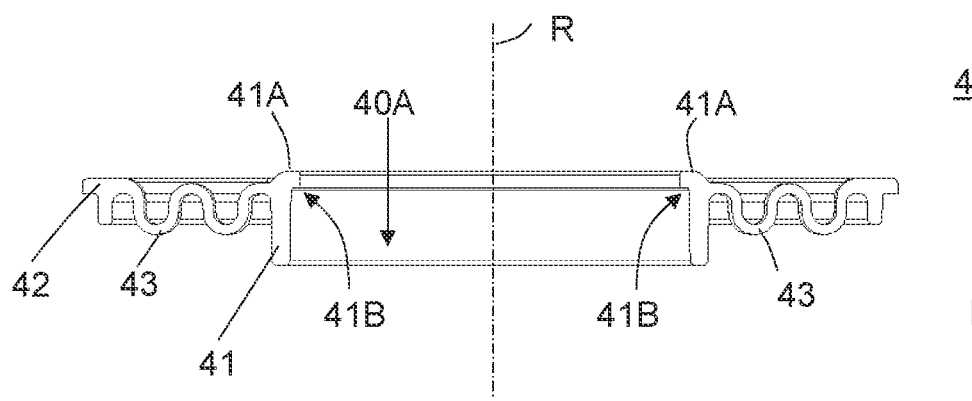
FIG. 5B shows the collar seal according to FIG. 5A in cross-section along plane E2 according to FIG. 5A seen in the direction of the arrows with reference numbers VB in FIG. 5A.

FIGS. 1, 5A and 5B show, for example, a form of embodiment of the collar seal 40 with six connecting sections 43. The connecting sections 43 can, for example, each extend radially to the axis of rotation R between the first annular section 41 and the second annular section 42.

The first annular section 41 and the second annular section 42 and the connecting sections 43 can differ in terms of their shape, their size and their mechanical properties in order to optimise the sealing effect of the collar seal 40. The first annular section 41 and the second annular section 42 can, for example, be made of a relatively hard material (plastic or metal, for instance), so that they exhibit a high degree of rigidity. In the case the first annular section 41 can, for example, be pressed with a high pressing force against the contact area 30-2 formed on the container 30 for the first annular section 41, thereby guaranteeing that the first annular section 41 of the collar seal 40 does not become bent. Furthermore, through this it can be prevented that splinters of the material to be ground that are produced during grinding can deform the first annular section 41 on impacting the collar seal 40.

The at least one connecting section 43 or the respective connection sections 43 can, for example, be designed as a spring element and accordingly be elastically deformable. In the case of the form of embodiment of the collar seal 40 shown in FIGS. 1, 5A and 5B great elastic deformability of the connecting sections 43 is achieved in that the respective connecting sections 32 have a wavelike profile radially to the axis of rotation R and a small thickness axially to the axis of rotation R in comparison with the first annular section 41 and the second annular section 42 of the collar seal 40.

In this way the at least one connecting section 43 or the respective connecting sections 43 are elastically deformable in such a way that the first annular section 41 is moveable relative to the second annular section 42, more particularly in the direction of the axis of rotation R. In this case the respective connecting sections 43 are usually designed to hold the first annular section 14 in a rest position relative to the second annular section 42. If the first annular section 41 is moved out of this rest position, the respective connecting sections 43 of the collar seal 40 are elastically deformed and produce a restoring force acting contrary to the movement. Accordingly, the first annular section 41 can be arranged relative to the second annular section 42 of the collar seal 40 so that the at least one connecting section 43 is elastically pre-tensioned and produces a pressing force which presses the contact area 41A for the container 30 formed on the first annular section 41 to the contact area 30-2 for the first annular section 41 formed on the container 30. The production of this pressing force results in an improved sealing effect of the collar seal 40. Through suitable shaping of the respective connecting sections 43 it can therefore be achieved that the contact area 41A for the container 30 is pressed onto the contact area 30-2 formed on the container 30 with a predetermined pressing force.

In order to improve the sealing effect of the collar seal 40 further, the first annular section 41 of the collar seal 40 is provided with a flange section 41B extending radially inwards in the vicinity of the contact area 41A (FIG. 5B). This flange section 41B has the effect that splinters of the material to be ground that are produced during grinding are flung upwards out of the grinding gap 20 and can hit the flange section 41B from below. This increases the pressing force with which the contact area 41A for the container 30 formed on the first annular section 41 is pressed to the contact area 30-2 for the first annular section 41 formed on the container 30 and thus improves the sealing effect of the collar seal 40.

The above-described pressing of the contact area 41A for the container 30 onto the contact area 30-2 formed on the container 30 also has the effect that mechanical vibrations produced in the grinding device 5 during grinding can be increasingly transmitted via the first annular section 41 of the collar seal 40 to the container 30. This affects the spatial distribution of material to be ground in the container 30 and advantageously has the effect that more even transporting of material to be ground from the container 30 into the grinding gap 20 is promoted.

It is also pointed out that the first grinding tool 11 and the second grinding tool 14 can be replaced by disk-shaped grinding tools of a disk grinder (as disclosed in EP 2 984 973 A1).

The invention claimed is:

1. A grinder (1) for grinding material to be ground comprising:
   a container (30) for receiving material to be ground with a discharge opening (30-1) for the material to be ground;
   a first grinding tool (11) and a second grinding tool (14), wherein the first grinding tool (11) is configured to be rotated relative to the second grinding tool (14) about an axis of rotation (R) such that material to be ground is enabled to be crushed to a powder in a grinding gap (20) formed between the first grinding tool (11) and the second grinding tool (14), wherein the second grinding tool (14) has an inlet channel (14-1) through which material to be ground discharged from the discharge opening (30-1) is enabled to be supplied into the grinding gap (20), and wherein the second grinding tool (14) is mounted in such a way that it is axially movable with regard to the axis of rotation (R) and is enabled to be brought into different positions (P1, P2) relative to the first grinding tool (11) and to the container (30);
   a housing (6) with an internal space delimited by the housing (6) in which the first grinding tool (11) and the second grinding tool (14) are arranged, wherein the container (30) is arranged stationarily relative to the housing (6);
   a collar seal (40) with a through channel (40A) extending along the axis of rotation (R), said collar seal (40) being arranged between the container (30) and the second grinding tool (14) so that material to be ground is enabled to fall from the container (30) through the discharge opening (30-1) of the container (30) via the through channel (40A) of the collar seal (40) into the inlet channel (14-1) of the second grinding tool (14);
   wherein the second grinding tool (14) comprises a wall section (16A) which extends annularly around the axis of rotation (R) and outwardly radially delimits the inlet channel (14-1);
   wherein the collar seal (40) comprises a first annular section (41), a second annular section (42) and at least one connecting section (43), the first annular section (41), the second annular section (42) and the at least one connecting section (43) being configured so that the first annular section (41) outwardly radially delimits the through channel (40A) and the second annular section (42) extends annularly around the axis of rotation (R) and is connected to the first annular section (41) via the at least one connecting section (43);
   wherein a contact surface (AF) for supporting the second annular section (42) of the collar seal (40) is present, the collar seal (40) being arranged between the contact surface (AF) and the container (30) so that the second annular section (42) of the collar seal (40) is in contact with and supported on the contact surface (AF) in order to hold the collar seal (40) in a predetermined position relative to the container (30),
   wherein the collar seal (40) is arranged stationarily relative to the container (30) such that the first annular section (41) extends axially to the axis of rotation (R) in such a way that a first area of the first annular section (41) is in contact with the container (30) and a second area of the first annular section (41) has an overlap (U) with the wall section (16A) of the second grinding tool (14) in the direction of the axis of rotation (R),
   wherein the at least one connecting section (43) extends radially to the axis of rotation (R) between the first annular section (41) and the second annular section (42) and is connected both to the first annular section (41) and also the second annular section (42), wherein the at least one connecting section (43) is designed as an elastically deformable spring element being elastically deformable in such a way that the first annular section (41) is moveable relative to the second annular section (42) in the direction of the axis of rotation (R).

2. The grinder (1) according to claim 1, wherein the contact surface (AF) is arranged stationarily relative to the container (30).

3. The grinder (1) according to claim 1, wherein the contact surface (AF) is arranged axially with regard to the axis of rotation (R) in such a way that the contact surface (AF) has a predetermined position relative to the container (30).

4. The grinder (1) according to claim 1, wherein the first annular section (41) and the second annular section (42) extend around the axis of rotation (R) in such a way that the first annular section (41) and the second annular section (42) are each at a distance from the axis of rotation (R).

5. The grinder (1) according to claim 1, wherein the second annular section (42) extends at a greater distance from the axis of rotation (R) than the first annular section (41).

6. The grinder (1) according to claim 1, wherein the second annular section (42) extends along the periphery of the first annular section (41) on the side of the first annular section (41) which faces away from the axis of rotation (R).

7. The grinder (1) according to claim 1, wherein the collar seal (40) comprises a plurality of connecting sections (43).

8. The grinder (1) according to claim 1, wherein on the container (30), a contact area (30-2) for the first annular section (41) of the collar seal (40) is formed which extends around the discharge opening (30-1), on the first annular section (41) of the collar seal (40), a contact area (41A) for the container (30) is formed which extends around the through channel (40A) and the first annular section (41) is arranged relative to the second annular section (42) such that the at least one connecting section (43) is elastically pretensioned and produces a pressing force which is designed to press the contact area (41A) for the container (30) formed on the first annular section (41) to the contact area (30-2) for the first annular section (41) formed on the container (30).

9. The grinder (1) according to claim 8, wherein the contact area (30-2) for the first annular section (41) formed on the container (30) is a flat surface and/or the contact area (41A) for the container (30) formed on the first; first annular section (41) is a flat surface.

10. The grinder (1) according to claim 1, wherein between the first annular section (41) of the collar seal (40) and the wall section (16A) of the second grinding tool (14) there is a gap (45) or during a movement of the second grinding tool (14) in the direction of the axis of rotation (R), the wall section (16A) of the second grinding tool (14) is in sliding contact on the first annular section (41).

11. The grinder (1) according to claim 1, wherein the overlap (U) has an extent (U1, U2) in the direction of the axis of rotation (R) which is changeable when the second grinding tool (14) is moved in the direction of the axis of rotation (R).

* * * * *